United States Patent
Hosokawa et al.

(10) Patent No.: US 6,475,668 B1
(45) Date of Patent: Nov. 5, 2002

(54) NONAQUEOUS ELECTROLYTE BATTERY SEALED IN A FILM CASE

(75) Inventors: Takehiro Hosokawa, Kanuma (JP); Keiichi Tanaka, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/736,396

(22) Filed: Dec. 15, 2000

(30) Foreign Application Priority Data

Dec. 17, 1999 (JP) .......................................... 11-359286

(51) Int. Cl.$^7$ ................................................ H01M 2/02
(52) U.S. Cl. ........................ 429/163; 429/167; 429/170
(58) Field of Search ........................... 49/163, 167, 170

(56) References Cited

FOREIGN PATENT DOCUMENTS

| JP | 57-115820 | 7/1982 | | |
|---|---|---|---|---|
| JP | 61-240564 | 10/1986 | | |
| JP | 3-62447 | 3/1991 | | |
| JP | 10-208709 | 8/1998 | | |
| JP | 10255731 | * | 9/1998 | ............ H01M/2/02 |

* cited by examiner

*Primary Examiner*—Carol Chaney
*Assistant Examiner*—Dah-Wei Yuan
(74) *Attorney, Agent, or Firm*—Smith, Gambrell & Russell, LLP

(57) ABSTRACT

A film case forming a nonaqueous electrolyte battery of this invention is formed by a packaging film including an engineering plastic layer, at least one metallic layer laminated inside the engineering plastic layer, at least one acid resistant layer laminated inside the metallic layer, and at least one water-proof thermoplastic polymer layer laminated inside the acid resistant layer. The acid resistant layer contains a thermoplastic polymer and at least one a metal compound, selected from the group consisting of magnesium oxide and hydrotalcites, in an amount of about 2 parts by weight to about 25 parts by weight with respect to 100 parts by weight of the thermoplastic polymer.

4 Claims, 4 Drawing Sheets

NONAQUEOUS ELECTROLYTE BATTERY SEALED IN A FILM CASE

BACKGROUND OF THE INVENTION

1. Field of the Invention

The present invention relates to a nonaqueous electrolyte battery used in, e.g., a power supply of an electronic apparatus and, more particularly, to a nonaqueous electrolyte battery having an anode, a cathode, and an electrolyte solution, all of which are sealed in a film case, an anode lead wire, and a cathode lead wire.

2. Related Background Art

Recently, rapid miniaturization of electronic apparatuses, particularly portable electronic apparatuses, is remarkably advancing. Accordingly, the development and practical use of high-performance power supplies which are small in size and light in weight and have high energy density are in strong demand.

In particular, a nonaqueous electrolyte battery, such as a lithium ion secondary battery, in which an anode, a cathode, and an electrolyte solution are sealed in a small and light film case is expected as a power supply of the small electronic apparatuses described above, since the battery has high battery voltage and high energy density and can be easily made compact and light in weight.

For this nonaqueous electrolyte battery, one important point which makes long battery life and long-term use possible is to increase the sealing properties of a nonaqueous electrolyte and thereby prevent decomposition of the non-aqueous electrolyte when it comes into contact with moisture.

As an attempt to improve the sealing properties of a nonaqueous electrolyte, Japanese Patent Laid-Open Nos. 61-240564, 3-62447, and 57-115820, for example, have disclosed the use of a film case manufactured by heat-sealing a packaging film including an acid-resistant thermoplastic polymer layer and a metallic layer. However, it is difficult to completely prevent an invasion of moisture from the heat-sealed portion of the film case only by the use of the acid-resistant thermoplastic polymer layer and the metallic layer. Moisture entering the battery from the outside reacts with the electrolyte solution to produce an acid, and this acid penetrates through the thermoplastic polymer layer to corrode the metallic layer. This corrosion of the metallic layer causes peeling between this metallic layer and the thermoplastic polymer layer, leading to a leak of the solution.

To prevent this, Japanese Patent Laid-Open No. 10-208709 has proposed a nonaqueous electrolyte battery which uses a packaging film in which a thermoplastic polymer layer containing metal compound particles is formed inside a metallic layer.

SUMMARY OF THE INVENTION

Unfortunately, even this nonaqueous electrolyte battery described in Japanese Patent Laid-Open No. 10-208709 is still unsatisfactory because in some cases it cannot be used for long time periods.

The present inventors studied why this nonaqueous electrolyte battery described in Japanese Patent Laid-Open No. 10-208709 cannot be well used for long time, and have found the reason.

That is, the intention of this prior application is to allow the metal compound contained in the thermoplastic polymer layer to absorb and decompose acid produced in a nonaqueous electrolyte solution before the acid moves to the metallic layer. This metal compound is conventionally contained in an amount of about 30 wt % in order to prevent corrosion of the metallic layer and prevent peeling between the metallic layer and the thermoplastic polymer layer caused by the corrosion of the metallic layer. However, when the content of the metal compound in the thermoplastic polymer layer is thus high, the strength of the thermoplastic polymer layer lowers to permit easy progress of deterioration such as cracking. Additionally, the adhesion of the heat-sealed portion of the packaging film becomes insufficient to promote an invasion of moisture from the outside.

Also, when cracking or the like occurs as described above, the acid produced in the nonaqueous electrolyte solution readily moves to the metallic layer. This accelerates the corrosion of the metallic layer and the peeling between this metallic layer and the thermoplastic polymer layer resulting from the corrosion of the metallic layer.

Furthermore, the metal compound particles not only absorb and decompose the acid moving from the nonaqueous electrolyte solution but also adsorb water produced by the reaction between this acid and the metal compound particles, thereby preventing the water from leaking out of the thermoplastic polymer layer. However, when the content of the metal compound in the thermoplastic polymer layer is high as described above and hence deterioration such as cracking progresses in this thermoplastic polymer layer, this moisture adsorbing function of the metal compound particles does not effectively function. Consequently, the produced water leaks out of the thermoplastic polymer layer to promote production of more acid in the nonaqueous electrolyte solution or comes in contact with the metallic layer, as acidic water containing an acid, thereby accelerate the corrosion of the metallic layer and the peeling between the metallic layer and the thermoplastic polymer layer.

Especially in a lithium ion secondary battery containing a fluorine-based lithium salt such as $LiPF_6$ in an electrolyte solution, highly corrosive hydrofluoric acid is produced by the reaction between water and this nonaqueous electrolyte solution. As a consequence, the above problem appears more significantly.

The present invention has been made in consideration of the above situation, and has as its object to provide a nonaqueous electrolyte battery having high sealing properties of an electrolyte solution and capable of being used for long time periods, even if acid is produced by an invasion of moisture, by sufficiently and reliably preventing corrosion of a metallic layer and detachment between this metallic layer and a thermoplastic polymer layer caused by the corrosion of the metallic layer over long periods of time.

The present inventors made extensive studies to achieve the above object and have reached the present invention by finding that when about 2 parts by weight to about 25 parts by weight (%) of a metal compound are contained in 100 parts by weight of a thermoplastic polymer and a water-proof thermoplastic polymer layer is formed inside the thermoplastic polymer layer (acid resistant layer) containing this metal compound, it is possible to sufficiently and reliably maintain the absorptivity to acid and water of the thermoplastic polymer layer containing the metal compound, the strength of the thermoplastic polymer layer, and the adhesion of a heat-sealed portion of the thermoplastic polymer layer over long time periods.

That is, a nonaqueous electrolyte battery of the present invention comprises a film case, an anode, a cathode, and an electrolyte solution sealed in the film case, an anode lead wire whose one end is connected to the anode and other end projects outside the film case, and a cathode lead wire whose one end is connected to the cathode and other end projects outside the film case, characterized in that the film case is formed by laminating two packaging films, each packaging film comprising an engineering plastic layer, a water-proof thermoplastic polymer layer, and interposing layers between the engineering plastic layer and the water-proof thermoplastic polymer layer, said interposing layers comprising at least one metallic layer, at least one acid resistant layer, and optionally at least one water-proof thermoplastic polymer layer, and the acid resistant layer contains a thermoplastic polymer and at least one metal compound, selected from the group consisting of magnesium oxide and hydrotalcites, in an amount of about 2 parts by weight to about 25 parts by weight with respect to 100 parts by weight of the thermoplastic polymer.

As described above, by laminating the acid resistant layer containing the metal compound on the side of the metallic layer facing the electrolyte solution, any acid produced by the reaction between moisture entering from the outside and the electrolyte solution is absorbed in the acid resistant layer before moving to the metallic layer. That is, the metal compound particles dispersed in the acid resistant layer adsorb the acid produced in the electrolyte solution and consumes the adsorbed acid by reacting with it. Therefore, even when the acid is produced by an invasion of moisture, it is possible to prevent the metallic layer from corroding by this acid or prevent detachment between the metallic layer and the thermoplastic polymer layer.

Water produced in the acid resistant layer by the reaction between the metal compound particles and the acid is also adsorbed in the metal compound particles. Since, therefore, this water produced in the acid resistant layer is prevented from moving from the acid resistant layer to the electrolyte solution, production of more acid in the electrolyte solution is prevented.

The "acid resistant layer" means a layer having a function of internally adsorbing acid moving from an external layer as described above, a function of consuming this acid by converting it into water by a chemical reaction, and a function of adsorbing water produced from the acid.

In this acid resistant layer, the content of the metal compound particles is preferably about 2 parts by weight to about 25 parts by weight with respect to 100 parts by weight of the thermoplastic polymer. In this case, the acid adsorbing and decomposing function of the acid resistant layer can be well achieved with no inconvenience, and the strength of the thermoplastic polymer layer can be well maintained. Additionally, the adhesion of the heat-sealed portion of the thermoplastic polymer layer can be well maintained. If the content of the metal compound particles is less than about 2 parts by weight with respect to 100 parts by weight of the thermoplastic polymer, the function of the acid resistant layer can no longer be well achieved. If the content exceeds about 25 parts by weight, the thermoplastic polymer forming the acid resistant layer becomes fragile, and the adhesion to an adjacent layer is weakened to allow easy peeling of the heat-sealed portion.

Also, by laminating at least one water-proof thermoplastic polymer layer containing no metal compound between the acid resistant layer and the electrolyte solution, water produced in the acid resistant layer is adsorbed in the metal compound particles and effectively prevented from moving from the acid resistant layer to the electrolyte solution by the water-repellent effect of the adjacent water-proof layer. Accordingly, it is possible to reliably prevent the water produced in the acid resistant layer from moving to the electrolyte solution to produce more acid.

The "engineering plastic" means plastic having excellent mechanical characteristics and high resistance and durability with which the material is used as mechanical parts, electrical parts, and building materials. Examples are polyacetal, polyamide, polycarbonate, polyoxytetramethyleneoxyterephthaloyl, polybutyleneterephthalate, polyethyleneterephthalate, polyimide, and polyphenylenesulfide.

The metal used in the metallic layer is not particularly limited provided that it has corrosion resistance. Although an aluminum foil or an aluminum alloy foil is generally used, it is also possible to use titanium or chromium.

The "hydrotalcites" indicate a group including compounds represented by a basic formula $Mg_6R_2(OH)_{16}CO_3 \cdot 4H_2O$ (R=Al, Cr, or Fe). For example, compounds such as hydrotalcite, stichtite, and pyroaurite are used.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
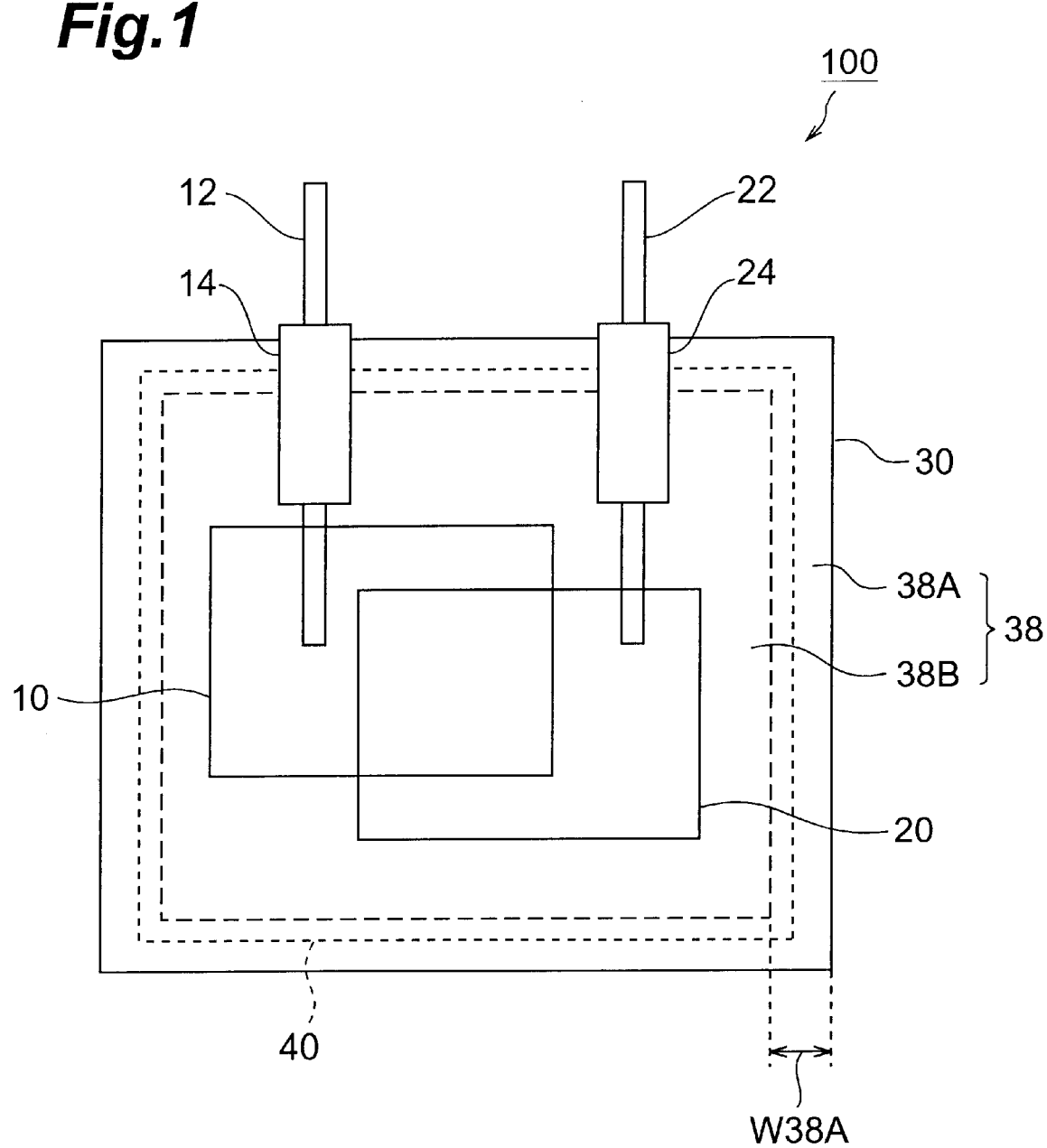
FIG. 1 is a schematic view showing the arrangement of one preferred embodiment of a nonaqueous electrolyte battery according to the present invention.

Preferred embodiments of a nonaqueous electrolyte battery according to the present invention will be described below with reference to the accompanying drawings. In the following description, the same reference numerals denote identical or equivalent parts, and a duplicate explanation thereof will be omitted.

Figure 2:
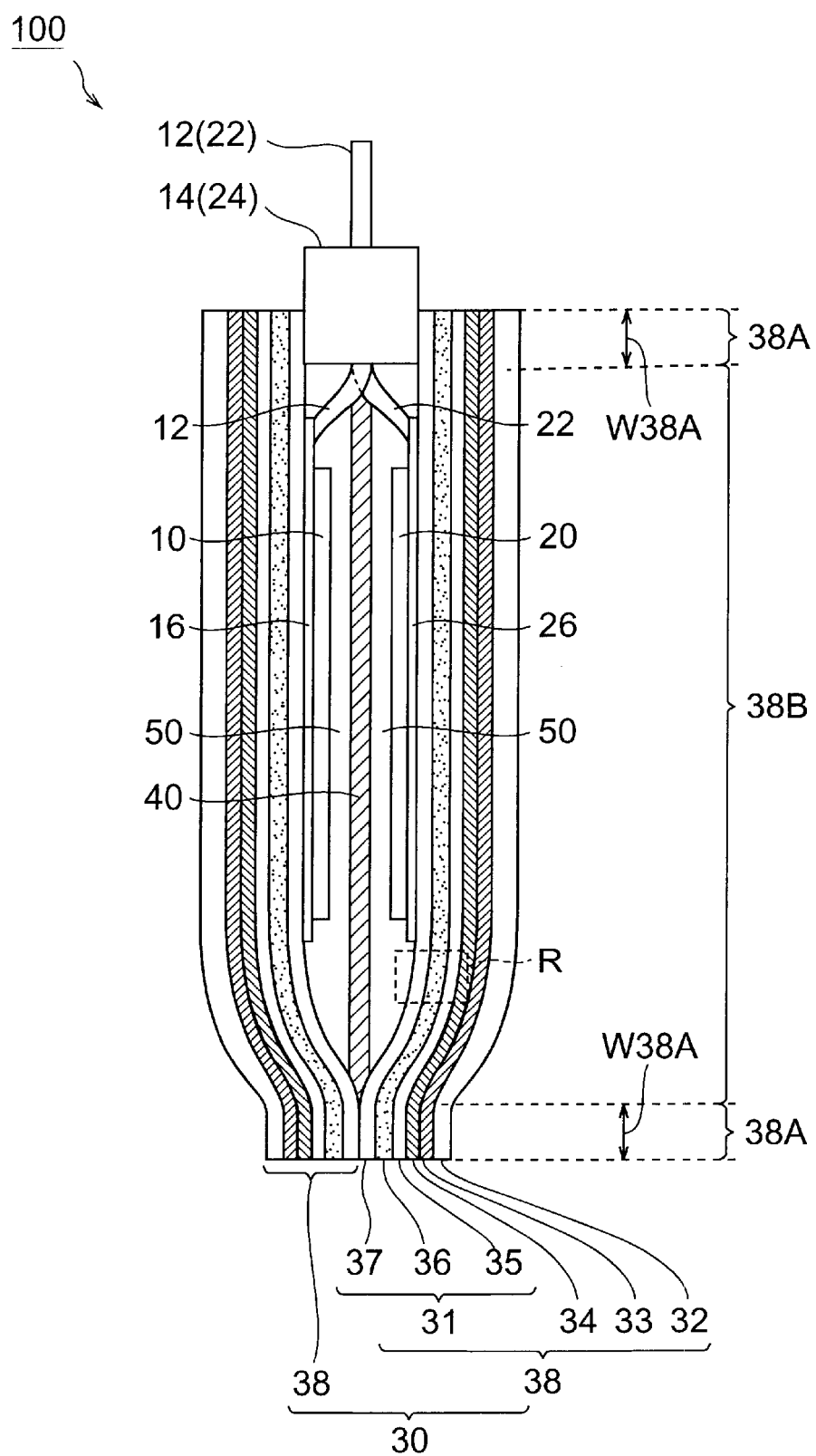
FIG. 2 is a schematic sectional view of the nonaqueous electrolyte battery shown in FIG. 1.

FIG. 1 is a schematic view showing the arrangement of one preferred embodiment of a nonaqueous electrolyte battery according to the present invention. FIG. 2 is a schematic sectional view of the nonaqueous electrolyte battery shown in FIG. 1.

As shown in FIGS. 1 and 2, this nonaqueous electrolyte battery 100 primarily includes a battery system which contains an anode 10, an anode lead wire 12 connected to the anode 10, a cathode 20, a cathode lead wire 22 connected to the cathode 20, a separator 40, and a nonaqueous electrolyte solution 50; and a film case 30 for sealing this battery system.

Details of each component of this embodiment will be described below with reference to FIGS. 1 and 2.

The nonaqueous electrolyte solution 50 shown in FIG. 2 is prepared by dissolving a metal salt in an organic solvent. In the case of a lithium ion secondary battery, for example, $LiBF_6$, $LiPF_6$, $LiAlCl_4$, $LiClO_4$, $LiCoO_2$, or the like is used as a lithium salt, and dimethyl carbonate, diethyl carbonate, ethylene carbonate, methylethyl carbonate, or the like is used as an organic solvent.

A collector 16 is electrically connected to the anode 10. One end of the lead wire 12 is electrically connected to the collector 16 by, e.g., spot welding. The other end of the lead wire 12 is extracted outside the film case 30. Furthermore, a portion where the lead wire 12 is in contact with a perimeter 38A of the film case 30 is covered with a sealing member 14 formed by an insulator. The perimeter 38A of the film case 30 and the sealing member 14 are welded by the heat-sealing method.

Similar to the anode 10, a collector 26 of the cathode 20 and the lead wire 22 are electrically connected. A contact portion of the lead wire 22 to the perimeter 38A of the film case 30 is covered with a sealing member 24 formed by an insulator. This sealing member 24 is also welded to the perimeter 38A of the film case 30 by the heat-sealing method.

The materials of the anode 10 and the cathode 20 are properly selected from conductive materials stable in the nonaqueous electrolyte solution 50 used. In the case of a lithium ion secondary battery, for example, a carbon material such as graphite is used as the anode 10, and a lithium metal oxide such as $LiCoO_2$ or $LiMn_2O_4$ is used as the cathode 20.

The materials of the collector 16 connected to the anode 10 and the collector 26 connected to the cathode 20 are also suitably chosen from conductive materials stable in the nonaqueous electrolyte solution 50 used.

The separator 40 is properly selected from thin porous insulators which avoid contact between two electrolyte solutions and have appropriate mechanical strength for holding an electrolyte. In the case of a lithium ion secondary battery, for example, a porous film such as a polypropylene film is used.

The film case 30 is formed by laying one packaging film 38 having a rectangular laminated structure on top of another and heat-sealing their four sides with pressure and heat. The anode 10, the cathode 20, and the nonaqueous electrolyte solution 50 are sealed in an inside portion 38B of the four sealed sides. A width W38A of the heat seal of the perimeter 38A of the packaging film 38 is appropriately set to such a dimension that the electrolyte solution 50 does not leak out of the nonaqueous electrolyte battery 100.

As shown in FIG. 2, each packaging film 38 forming the film case 30 has a structure in which an engineering plastic layer 32, a urethane-based adhesive layer 33, a metallic layer 34, and a thermoplastic polymer layer 31 are laminated in this order from the outside to the inside toward the nonaqueous electrolyte solution 50. This packaging film 38 can be manufactured by a known manufacturing method such as dry lamination, wet lamination, hot-melt lamination, or extrusion lamination.

The engineering plastic layer 32 prevents exposure of the metallic layer 34 to the outside and also prevents a failure of the tightness of the metallic layer 34 by damage. The material of this engineering plastic layer 32 is suitably selected from, e.g., polyethyleneterephthalate (PET) or polyamide (nylon).

The urethane-based adhesive layer 33 adheres the engineering plastic layer 32 and the metallic layer 34. This urethane-based adhesive layer 33 is made from a urethane-based adhesive formed by mixing and crosslinking polyol and isocyanate.

The metallic layer 34 prevents a leak of the nonaqueous electrolyte solution 50 and prevents an invasion of moisture from the outside. As described previously, this metallic layer 34 is made of a corrosion-resistant metal material. Although an aluminum foil, an aluminum alloy foil, or aluminum is generally used, titanium, chromium, or the like is also usable. The thickness of the metallic layer 34 is properly set in accordance with the use conditions of the film case 30 and the characteristics such as the strength and elasticity required of the film case 30.

As shown in FIG. 2, the thermoplastic polymer layer 31 has a structure in which a water-proof layer 35, an acid resistant layer 36, and another water-proof layer 37 are laminated in this order from the outside to the inside toward the nonaqueous electrolyte solution 50.

The acid resistant layer 36 is formed by a thermoplastic polymer which neither dissolves nor swells even when contacting the nonaqueous electrolyte solution 50. Examples are polyethylene, a polyethylene acid modified product, a polypropyrene acid modified product, a polyethylene ionomer, and a polypropyrene ionomer. In this acid resistant layer 36, at least one metal compound particles selected from the group consisting of magnesium oxide and hydrotalcites are dispersed and blended. The metal compound particles are dispersed at a ratio of 2 to 25 parts by weight with respect to 100 parts by weight of the thermoplastic polymer.

The dispersion conditions such as the average particle diameter and particle size distribution of the metal compound particles are not particularly restricted; they are set in accordance with the amount of acid produced in the nonaqueous electrolyte solution 50, the amount of water produced by the reaction between the acid and the metal compound particles, and the thickness of the acid resistant layer. However, the average particle diameter is preferably about 0.01 $\mu$m to about 5 $\mu$m. When the average particle diameter is about 0.01 $\mu$m to about 5 $\mu$m, the metal compound particles are highly dispersed with an appropriate surface area in the thermoplastic polymer. This makes it possible to form a thermoplastic polymer which can well adsorb acid and has sufficient strength. If the average particle diameter exceeds about 5 $\mu$m, metal compound particles having large diameters compared to the thickness of the thermoplastic polymer layer locally exist, and at the same time the surface area of the particles decreases. Consequently, the thermoplastic polymer can no longer well adsorb acid, and the tendency of the strength of the thermoplastic polymer to lower increases. On the other hand, if the average particle diameter is less than about 0.01 $\mu$m, the metal compound particles become difficult to prepare. Also, since the grain diameter is extremely small, the tendency of the metal compound particles themselves to become readily decomposable by the reaction with acid increases. This increases the tendency to become unable to steadily adsorb and decompose acid.

Furthermore, the thickness of the acid resistant layer 36 is not particularly limited; it is set in accordance with the amount of acid produced in the nonaqueous electrolyte solution 50, the amount of water produced by the reaction between the acid and the metal compound particles, and the type and dispersion conditions of the metal compound particles, such that the necessary characteristics such as strength and elasticity are obtained. However, this thickness is preferably about 10 μm to about 50 μm. If the thickness is less than about 10 μm, the tendency to become unable to reliably adsorb and decompose the acid produced in the nonaqueous electrolyte solution 50 increases. Also, the tendency of the acid resistant layer 36 to become difficult to form increases. On the other hand, the function of this acid resistant layer 36 to reliably adsorb and decompose the acid produced in the nonaqueous electrolyte solution 50 is well achieved when the thickness of the acid resistant layer 36 is about 10 μm to about 50 μm, under the dispersion conditions of the metal compound described above. If the thickness of the acid resistant layer 36 exceeds about 50 μm, the tendency of inconvenience such as an increase in the weight of the film case 30 to occur increases.

The water-proof layer 35 adheres the acid resistant layer 36 and the metallic layer 34 and prevents the movement of water produced in the acid resistant layer 36 to the metallic layer 34. This water-proof layer 35 is made from a low-density polyethylene (LDPE) acid modified product. The thickness of the water-proof layer 35 is not particularly limited as long as it is possible to well prevent the movement of water produced in the acid resistant layer 36 to the metallic layer 34.

The water-proof layer 37 holds the nonaqueous electrolyte solution 50. Similar to the acid resistant layer 36, this water-proof layer 37 is formed by a thermoplastic polymer, such as polyethylene, a polyethylene acid modified product, a polypropyrene acid modified product, a polyethylene ionomer, or a polypropyrene ionomer, which neither dissolves nor swells even when contacting the nonaqueous electrolyte solution 50. The thickness of the water-proof layer 37 is also not particularly restricted as long as it is possible to well prevent the movement of water produced in the acid resistant layer 36 to the nonaqueous electrolyte solution 50.

The function of the nonaqueous electrolyte battery of this embodiment will be described below with reference to FIG. 3.

Figure 3:
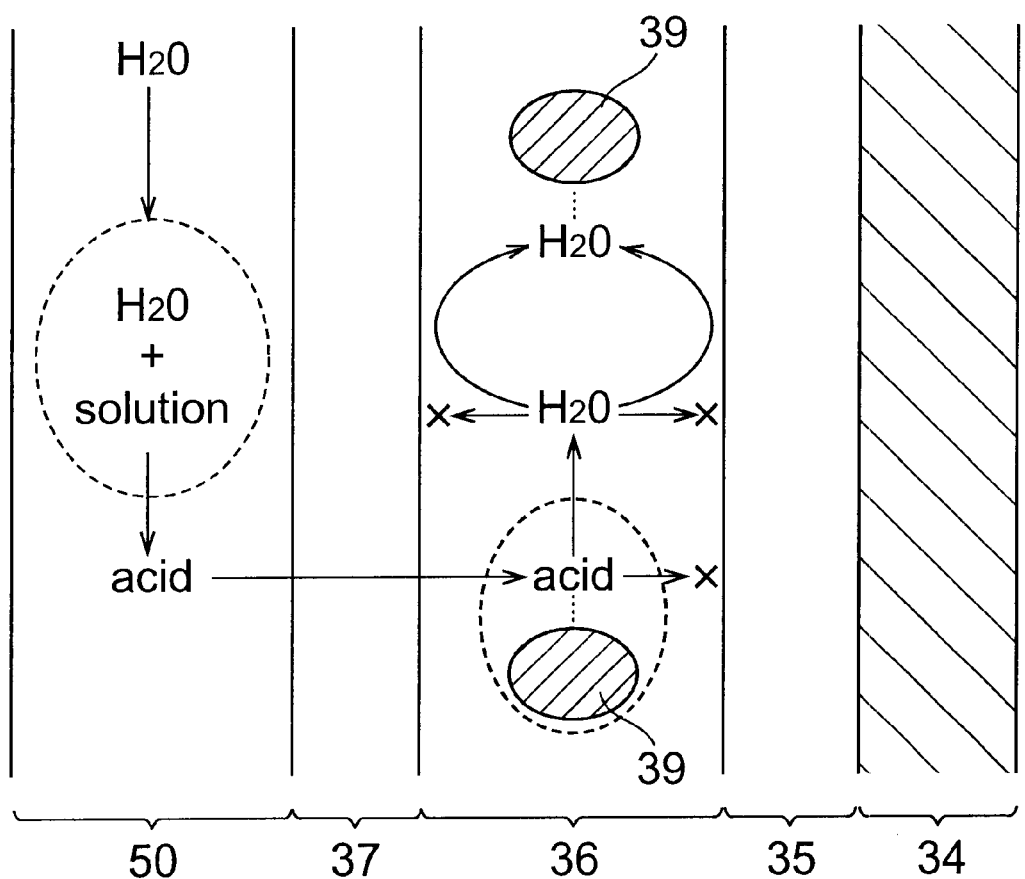
FIG. 3 is an enlarged view of a region R enclosed with the dotted lines in FIG. 2.

FIG. 3 is an enlarged view of a region R enclosed with the dotted lines in the schematic sectional view of the nonaqueous electrolyte battery 100 shown in FIG. 2.

While the nonaqueous electrolyte battery 100 is used or stored for long time periods, moisture sometimes enters into the nonaqueous electrolyte solution 50 from the outside through the sealed portion of the packaging film 38.

If this is the case, the nonaqueous electrolyte solution 50 reacts with this water to produce an acid first. For example, when a fluorine-based lithium salt is present in the nonaqueous electrolyte solution 50, hydrofluoric acid is produced. This acid moves to the acid resistant layer 36 through the water-proof layer 37. In this acid resistant layer 36, aforementioned metal compound particles 39 are dispersed in an amount of 2 to 25 parts by weight with respect to 100 parts by weight of the thermoplastic polymer which forms the acid resistant layer 36. The metal compound particles 39 adsorb and chemically react with nearly the whole acid that has moved to the acid resistant layer 36, thereby producing water. In this chemical reaction, the acid and the metal compound particles 39 cause an acid-base reaction to produce a salt and water or cause a redox reaction to produce water.

In this manner, the acid produced in the nonaqueous electrolyte solution 50 is trapped in the acid resistant layer 36 and hence the layer 36 prevents the solution 50 from moving to the metallic layer 34 through the water-proof layer 35. Accordingly, it is possible to prevent corrosion of the metallic layer 34 by the acid and peeling between the metallic layer 34 and the water-proof layer 35 due to corrosion of the metallic layer 34.

Also, the water produced in the acid resistant layer 36 is adsorbed by hydrogen bonds to the surfaces of the metal compound particles 39 or repelled by the water-proof layers 35 and 37 laminated on the two sides of the acid resistant layer 36. Consequently, the water is reliably trapped in this acid resistant layer 36, which prevents the water produced by the reaction between the metal compound particles 39 and the acid in the acid resistant layer 36 from moving to the nonaqueous electrolyte solution 50 to produce more acid.

Trapping water in the acid resistant layer as described above is also advantageous to facilitate efficient trapping of the acid, moving from the nonaqueous electrolyte solution 50, inside the acid resistant layer 36. Therefore, laminating the water-proof layers 37 and 35 on the acid resistant layer 36 is advantageous not only to trap water produced in the acid resistant layer 36 inside this acid resistant layer 36 but also to efficiently trap acid inside the acid resistant layer 36. This helps reliably prevent corrosion of the metallic layer 34 and peeling between the metallic layer 34 and the water-proof layer 37 caused by corrosion of the metallic layer 34 over long time periods.

Additionally, in the acid resistant layer 36 the metal compound particles 39 having an acid trapping function are dispersed in an amount of 2 to 25 parts by weight with respect to 100 parts by weight of the thermoplastic polymer which forms the acid resistant layer 36. Hence, the acid resistant layer 36 has strength with which it can be used for long time. Also, the heat-sealed portion between this acid resistant layer 36 and the water-proof layers 35 and 37 has adhesion with which this portion can be used for long time. Accordingly, it is possible by these strength and adhesion of the acid resistant layer and heat-sealed portion to sufficiently and reliably prevent corrosion of the metallic layer 34 and peeling between the metallic layer 34 and the water-proof layer 35 over long time periods.

One preferred embodiment of the present invention has been described in detail above, but the present invention is not limited to this embodiment.

For example, the material of the water-proof layer 35 is not particularly restricted, so a urethane-based adhesive or the like can also be used.

In the nonaqueous electrolyte battery 100 of the above embodiment, the urethane layer 35 is used to adhere the engineering plastic layer 32 and the metallic layer 34. However, this layer for adhering the engineering plastic layer 32 and the metallic layer 34 is not particularly limited. For example, it is possible to use a polyester-based adhesive, epoxy-based adhesive, or hot-melt type adhesive. Furthermore, the engineering plastic layer 32 and the metallic layer 34 can also be thermally adhered directly without using any such layer.

In the nonaqueous electrolyte battery 100 of the embodiment, the thermoplastic polymer layer 31 has a laminated structure in which the acid resistant layer 36 is inserted between the two water-proof layers 35 and 37. However, the internal lamination pattern of this thermoplastic polymer layer is not restricted to this structure of the above embodiment. As an example, the acid resistant layer 36 can be directly laminated on the metallic layer 34 without laminating the water-proof layer 35. Alternatively, a plurality of water-proof layers, a plurality of metallic layers, and a plurality of acid resistant layers can be laminated if necessary.

EXAMPLES

The contents of the nonaqueous electrolyte battery of the present invention will be described in more detail below by way of its examples and comparative examples. However, the present invention is not at all limited to these examples.

Example 1

As rectangular packaging films (70 mm×135 mm), two films were formed by laminating, from the outside, six layers, i.e., a PET layer (engineering plastic layer, thickness; 12 $\mu$m), a urethane-based adhesive layer (thickness; 12 $\mu$m), a metallic layer (thickness; 9 $\mu$m), an LDPE acid modified product layer (water-proof layer, thickness; 20 $\mu$m), a magnesium oxide dispersed LDPE layer (acid resistant layer, thickness; 50 $\mu$m), and an LDPE layer (water-proof layer, thickness; 20 $\mu$m). Note that STIRMAG M (average particle diameter; 3.5 $\mu$m) available from Kamishima Kagaku Kogyo K.K. was used as the magnesium oxide, and a mixture of TAKERACK A500 (trade name) and TAKENATE A3 (trade name) (10 wt % of TAKENATE A3 were mixed in TAKERACK A500) available from Takeda Chemical Industries, Ltd. was used as the urethane-based adhesive. Note also that the weight ratio of the magnesium oxide to the LDPE in the magnesium oxide dispersed LDPE layer was set to 100:10.

Next, one of these two packaging films was laid on top of another such that their LDPE layers were inside, and three sides of the perimeters of these rectangular packaging films were heat-sealed for 5 sec at a pressure of 0.2 MPa and a temperature of 160° C., thereby forming a film case. The width of this heat seal was set to 5 mm.

Separately, a nonaqueous electrolyte solution was prepared by dissolving $LiPF_6$ at a concentration of 1 mol/L in a solution mixture (volume ratio 1:1:1) of ethylene carbonate, diethyl carbonate, and dimethyl carbonate.

2 g of this nonaqueous electrolyte solution were placed in the manufactured film case, and the one remaining side was heat-sealed under the same conditions as above.

Example 2

A film case was manufactured following the same procedures as in Example 1 except that a hydrotalcite dispersed LDPE layer in which the weight ratio of hydrotalcite (DHT 4A (trade name) manufactured: by Kyowa Kagaku Kogyo K.K., treaded with a 1 $\mu$m mesh) to LDPE was set to 100:2.5 was used instead of the magnesium oxide dispersed LDPE layer.

Example 3

A film case was manufactured following the same procedures as in Example 1 except that a hydrotalcite dispersed LDPE layer in which the weight ratio of hydrotalcite to LDPE was set to 100:10, used in Example 2, was used instead of the magnesium oxide dispersed LDPE layer.

Example 4

A film case was manufactured following the same procedures as in Example 1 except that a "hydrotalcite dispersed LDPE layer in which the weight ratio of the hydrotalcite to LDPE was set to 100:20" used in Example 2 was used instead of the "magnesium oxide dispersed LDPE layer".

Comparative Example 1

A film case was manufactured following the same procedures as in Example 1 except that a "hydrotalcite dispersed LDPE layer in which the weight ratio of the hydrotalcite to LDPE was set to 100:50" used in Example 2 was used instead of the magnesium oxide dispersed LDPE layer.

Comparative Example 2

A film case was manufactured following the same procedures as in Example 1 except that a layer containing only LDPE was used instead of the magnesium oxide dispersed LDPE layer.

Comparative Example 3

A film case was manufactured following the same procedures as in Example 1 except that a "hydrotalcite dispersed LDPE layer in which the weight ratio of the hydrotalcite to LDPE was set to 100:1.51" used in Example 2 was used instead of the magnesium oxide dispersed LDPE layer.

Comparative Example 4

A film case was manufactured following the same procedures as in Example 1 except that a "hydrotalcite dispersed LDPE layer in which the weight ratio of the hydrotalcite to LDPE was set to 100:60" used in Example 2 was used instead of the magnesium oxide dispersed LDPE layer.

Comparative Example 5

A film case was manufactured following the same procedures as in Example 1 except that a "hydrotalcite dispersed LDPE layer in which the weight ratio of the hydrotalcite to LDPE was set to 100:30" used in Example 2 was used instead of the magnesium oxide dispersed LDPE layer.

Three samples were prepared for each of Examples 1 to 4 and Comparative Examples 1 to 5. Evaluation of a corrosion inhibiting effect by a corrosion resistance test described below and evaluation of the adhesion of the heat-sealed portion of each film case and the strength of each film case by two types of tensile tests were carried out in this order. Finally, each sample was collectively evaluated by combining the results of these three evaluation tests from the point of view of long-term use.

[Corrosion Resistance Test]

Three samples were prepared for each of Examples 1 to 4 and Comparative Examples 1 to 5. On the basis of a "moisture test method" described in JIS K 2246-1991.5.34, these samples were placed in a thermo-hygrostat chamber and held still for three weeks at 60° C. and relative humidity 95%. A change with time of the state of the external appearance of each film case resulting from the progress of corrosion of the metallic layer was observed and evaluated each week.

The state of corrosion of the metallic layer which progressed inside the film case could be readily evaluated from observation of the external appearance of the film case for the following reason.

That is, when corrosion of a metallic layer progresses in a film case manufactured from very thin packaging films as in the samples of Examples 1 to 4 and Comparative Examples 1 to 5, this corrosion of the metallic layer produces a corrosion product or causes peeling between the metallic layer and an LDPE acid modified product layer contacting the metallic layer. This results in significant changes in the external appearance, e.g., unevenness or cracking of the outer surfaces of the film case.

These test results were evaluated, with respect to the state of the external appearance of the film case, on the basis of evaluation criteria: 3; corrosion of the internal metallic layer hardly progresses, and no change is found on the external appearance of the film case, 2; corrosion of the internal metallic layer slightly progresses, and slight unevenness is found on the surfaces of the film case, and 1; corrosion of the internal metallic layer significantly progresses, and considerable unevenness found on the surfaces of the film case. Table 1 shows the obtained results. Note that each evaluation shown in Table 1 indicates the result of one of the three samples prepared for each example or comparative example, in which the progress of corrosion was fastest.

[Tensile Test 1]

A tensile test was conducted following the procedures below in order to evaluate the adhesion of the heat-sealed portion of the LDPE layer (acid resistant layer) in which magnesium oxide or hydrotalcite was dispersed, used in Examples 1 to 4 or Comparative Examples 1 and 3 to 5, or of the LDPE layer in which neither magnesium oxide nor hydrotalcite was dispersed, used in Comparative Example 2.

First, the same packaging film as used in Examples 1 to 3 and Comparative Examples 1 to 4 was manufactured except that five layers, except the LDPE layer (water-proof layer) in contact with the nonaqueous electrolyte solution, were laminated. This packaging film was used to form three film case samples, corresponding to each of Examples 1 to 3 and Comparative Examples 1 to 4, without sealing the nonaqueous electrolyte solution.

In each sample, layers corresponding to acid resistant layers of the two packaging films were welded by a 5-mm wide heat seal. The strength of this welded portion was measured by the following method.

Figure 4A:
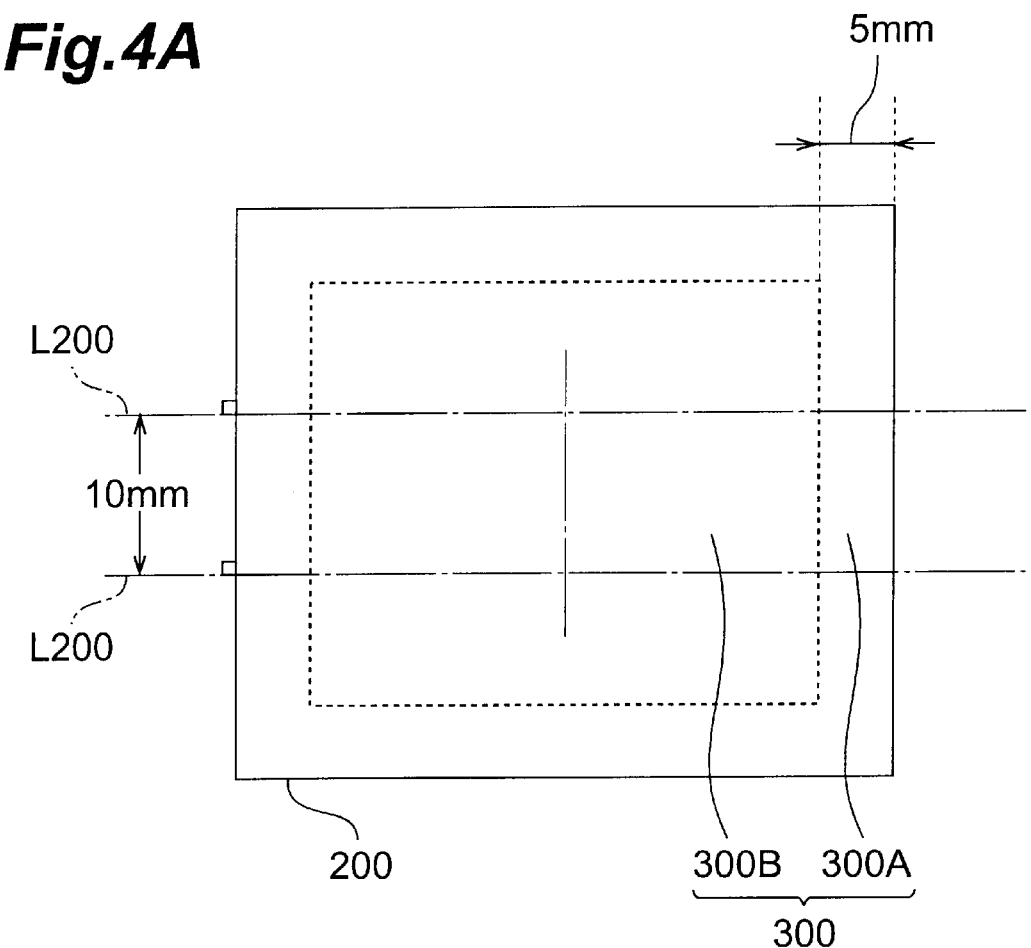
FIG. 4A is a view for explaining a procedure of cutting a specimen from a sample in evaluation of the sealing strength.

As shown in FIG. 4A, a central portion of a pair of opposing sides of a rectangular sample 200 was cut into a 10-mm wide rectangle such that cut lines L200 were parallel to the other pair of opposing sides. The long sides of this rectangle were cut to form a 10-mm wide, 50-mm long rectangular specimen 300. A heat-sealed portion 300A of this specimen had a width of 10 mm and a length of 5 mm.

On the basis of "tensile strength and elongation" described in JIS Z 0237-1991.6, the adhesion of the heat-sealed portion of the specimen of each sample was measured as sealing strength defined below.

Figure 4B:
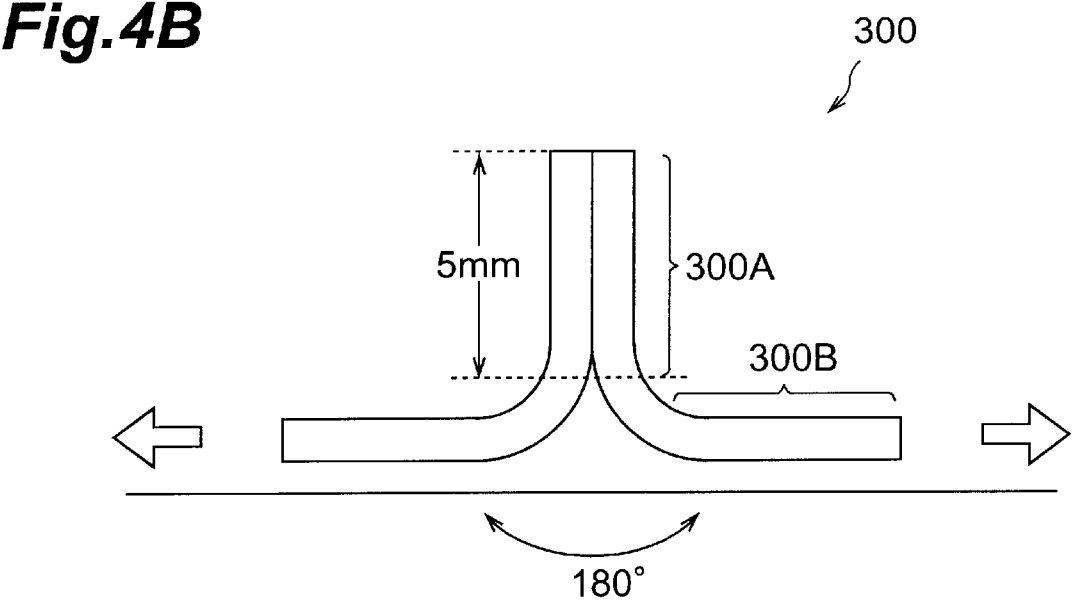
FIG. 4B is a view for explaining a test method of evaluating the sealing strength.

As shown in FIG. 4B, a tensile test machine defined by JIS Z 0237-1991.6.2 was used to open, through 180°, a portion 300B, which was not heat-sealed, of the specimen of each example or comparative example, grasp the two ends of the open portion, and pull the sealed portion in a peeling direction at a pulling rate of 50 mm/min. The maximum stress [kg/cm] per unit width observed at that time was measured and evaluated as "sealing strength".

Generally, the adhesion of the heat-sealed portion is satisfactory if this sealing strength is 1 kg/cm or more. In this case, the heat-sealed portion is presumably well usable for long time periods with no peeling, even when applied with external force caused by changes in the actual use environment, e.g., a rise of the liquid pressure of the nonaqueous electrolyte solution resulting from temperature change or external shock. On the other hand, if the sealing strength is less than 1 kg/cm, the adhesion of the heat-sealed portion is unsatisfactory. In this case, the sealed portion readily peels in the actual use environment, and this increases the tendency of inconvenience, such as a leak of the nonaqueous electrolyte solution to the outside, to occur.

That is, when the sealing strength of each sample is 1 kg/cm or more, the evaluation is that the heat-sealed portion can be used with almost no peeling in the use environment. When the sealing strength is less than 1 kg/cm, the evaluation is that the heat-sealed portion readily peels and hence is unusable in the use environment.

Table 1 also shows the test results of these samples. Note that each evaluation shown in Table 1 indicates the result of one of the three samples prepared for each example or comparative example, with which the sealing strength was smallest.

[Tensile test 2]

A tensile test was conducted following the procedures below in order to evaluate the strength against shock, vibration, and pulling in the use environment of the LDPE layer (acid resistant layer) in which magnesium oxide or hydrotalcite was dispersed, used in Examples 1 to 4 or Comparative Examples 1 and 3 to 5, or of the LDPE layer in which neither magnesium oxide nor hydrotalcite was dispersed, used in Comparative Example 2.

First, an LDPE layer (acid resistant layer) identical with that used in Examples 1 to 3 and Comparative Examples 1 to 4 was manufactured as a film.

Next, following the same procedure as in tensile test 1, the manufactured LDPE film was cut to form a 5-mm wide, 100-mm long rectangular specimen.

On the basis of "tensile strength and elongation" described in JIS Z 0237-1991.6, elongation of each specimen was measured.

Next, following the same procedure as in tensile test 1, a tensile test machine defined by JIS Z 0237-1991.6.2 was used to grasp the two ends of the specimen of each example or comparative example and pull the specimen in an elongating direction at a pulling rate of 50 mm/min. The elongation (%) when the specimen was broken was measured.

When a thermoplastic polymer film is used as the acid resistant layer in the film case of the nonaqueous electrolyte battery of the present invention, the strength of this thermoplastic polymer film (acid resistant layer) is satisfactory if the elongation is 300% or more. In this case, the thermoplastic polymer film is well usable for long time periods without producing any cracking and the like by deterioration, even when applied with external force caused by changes in the actual use environment, e.g., a rise of the liquid pressure of the nonaqueous electrolyte solution resulting from temperature change, external shock, or pulling. On the other hand, if the elongation is less than 300%, the strength of the thermoplastic polymer film (acid resistant layer) is unsatisfactory. Consequently, the film cannot follow external changes in the actual use environment and readily deteriorates to form cracks and the like. This increases the tendency of inconvenience, such as an easy leak of the nonaqueous electrolyte solution from these cracks to the outside, to occur.

That is, when the elongation of each sample is 300% or more, the evaluation is that the thermoplastic polymer film (acid resistant layer) has satisfactory strength and is usable in the use environment. When the elongation is less than 300%, the evaluation is that the thermoplastic polymer film (acid resistant layer) has unsatisfactory strength and is unusable in the use environment.

Table 1 also shows the test results of these samples. Note that each evaluation shown in Table 1 indicates the average value of the elongations of the three samples prepared for each example or comparative example.

Furthermore, the results of the three tests described above were collectively evaluated on the basis of evaluation criteria: 3; all of the corrosion resistance, the adhesion of the heat-sealed portion, and the resin strength are superior, so long-term use is well possible, 2; one of the corrosion resistance, the adhesion of the heat-sealed portion, and the resin strength is slightly inferior, but long-term use is possible, 1; one of the corrosion resistance, the adhesion of the heat-sealed portion, and the resin strength is significantly inferior, so long-term use is impossible. The obtained results are shown in Table 1.

TABLE 1

| | Content of metal compound (weight ratio to 100 parts by weight of LDPE) | | Evaluation of corrosion resistance | | | Evaluation of adhesion of heat-sealed portion | Evaluation of tensile | |
|---|---|---|---|---|---|---|---|---|
| | Magnesium oxide | Hydrotalcite | one week | two weeks | three weeks | (sealing strength kg/cm) | elongation (%) | Collective evaluation |
| Example 1 | 10.0 | — | 3 | 3 | 3 | >1.0 | >500 | 3 |
| Example 2 | — | 2.5 | 3 | 3 | 2 | >1.0 | >500 | 2 |
| Example 3 | — | 10.0 | 3 | 3 | 3 | >1.0 | >500 | 3 |
| Example 4 | — | 20.0 | 3 | 3 | 3 | >1.0 | 380 | 3 |
| Comparative Example 1 | — | 50.0 | 3 | 3 | 3 | >1.0 | 40 | 1 |
| Comparative Example 2 | — | — | 1 | — | — | >1.0 | >500 | 1 |
| Comparative Example 3 | — | 1.5 | 1 | — | — | >1.0 | >500 | 1 |
| Comparative Example 4 | — | 60.0 | 3 | 3 | 3 | 0.7 | 20 | 1 |
| Comparative Example 5 | — | 30.0 | 3 | 3 | 3 | >1.0 | 240 | 1 |

As is apparent from the results shown in Table 1, in the nonaqueous electrolyte battery of the present invention in each of Examples 1 to 4, the acid resistant layer of the packaging material forming the film case contained 2 to 25 parts by weight of magnesium oxide or hydrotalcite with respect to 100 parts by weight of LDPE. Hence, the film case had satisfactory corrosion resistance, satisfactory adhesion of the heat-sealed portion, and satisfactory resin strength against the use environment. This allowed the film case to be used for long time periods.

As has been described above, the present invention can provide a nonaqueous electrolyte battery having high sealing properties of an electrolyte solution, resulting from an acid resistant layer and a water-proof layer, and capable of being used for long time periods, even if acid is produced by an invasion of moisture, by sufficiently and reliably preventing corrosion of a metallic layer caused by the acid and peeling between this metallic layer and a thermoplastic polymer layer (acid resistant layer or water-proof layer) caused by the corrosion of the metallic layer over long periods of time.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A nonaqueous electrolyte battery comprising:
   a film case;
   an anode, a cathode, and an electrolyte solution sealed in said film case;
   an anode lead wire whose one end is connected to said anode and other end projects outside said film case; and
   a cathode lead wire whose one end is connected to said cathode and other end projects outside said film case,
   wherein said film case is formed by laminating two packaging films, each packaging film comprising an engineering plastic layer, a water-proof thermoplastic polymer layer, and interposing layers between the engineering plastic layer and the water-proof thermoplastic polymer layer, said interposing layers comprising at least one metallic layer, at least one acid resistant layer, and optionally at least one water-proof thermoplastic layer, and
   said acid resistant layer contains a thermoplastic polymer and at least one metal compound, selected from the group consisting of magnesium oxide and hydrotalcites, in an amount of about 2 parts by weight to about 25 parts by weight with respect to 100 parts by weight of said thermoplastic polymer,
   wherein said hydrotalcites are compounds represented by the following formula:

$$Mg_6R_2(OH)_{16}CO_3 \cdot 4H_2O$$

wherein R indicates one element selected from the group consisting of Al, Cr, and Fe.

2. A battery according to claim 1, wherein the thickness of said acid resistant layer is about 10 μm to about 50 μm.

3. A battery according to claim 1, wherein the average particle diameter of said metal compound is about 0.01 μm to about 5 μm.

4. A battery according to claim 1, wherein a thermoplastic polymer layer forming said acid resistant layer is made from at least one thermoplastic polymer selected from the group consisting of polyethylene, polypropyrene, a polyethylene acid modified product, a polypropyrene acid modified product, a polyethylene ionomer, and a polypropyrene ionomer.

* * * * *